United States Patent
Kim et al.

(10) Patent No.: US 9,018,568 B2
(45) Date of Patent: *Apr. 28, 2015

(54) HEATING GLASS AND MANUFACTURING METHOD THEREOF

(71) Applicant: LG Chem Ltd., Seoul (KR)

(72) Inventors: Su-Jin Kim, Daejeon (KR); Hyeon Choi, Daejeon (KR); Ki-Hwan Kim, Daejeon (KR); Young-Jun Hong, Daejeon (KR); In-Seok Hwang, Daejeon (KR); Dong-Wook Lee, Daejeon (KR); Sang-Ki Chun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,004

(22) Filed: Jul. 8, 2013

(65) Prior Publication Data

US 2014/0158677 A1 Jun. 12, 2014

Related U.S. Application Data

(63) Continuation of application No. 13/521,421, filed as application No. PCT/KR2011/000069 on Jan. 6, 2011.

(30) Foreign Application Priority Data

Jan. 12, 2010 (KR) .................. 10-2010-0002494

(51) Int. Cl.
*H05B 3/50* (2006.01)
*H05B 3/84* (2006.01)
*C03C 17/36* (2006.01)
*B41M 1/06* (2006.01)
*B41M 1/10* (2006.01)
*B41M 1/12* (2006.01)
*B41M 1/34* (2006.01)

(52) U.S. Cl.
CPC ................ *H05B 3/84* (2013.01); *Y10T 156/10* (2015.01); *B41M 1/06* (2013.01); *B41M 1/10* (2013.01); *B41M 1/12* (2013.01); *B41M 1/34* (2013.01); *C03C 17/36* (2013.01); *C03C 17/3607* (2013.01); *C03C 17/3673* (2013.01); *C03C 2217/94* (2013.01); *H05B 2203/017* (2013.01)

(58) Field of Classification Search
USPC .................................. 219/203, 522, 543, 544
See application file for complete search history.

(56) References Cited

U.S. PATENT DOCUMENTS

| | | | | |
|---|---|---|---|---|
| 6,576,869 | B1 * | 6/2003 | Gower et al. ............ | 219/121.71 |
| 7,129,444 | B2 * | 10/2006 | Weiss ............................ | 219/203 |
| 2006/0096967 | A1 * | 5/2006 | Weiss ............................ | 219/203 |
| 2007/0160922 | A1 * | 7/2007 | Kashiwabara et al. .... | 430/108.1 |
| 2008/0038529 | A1 * | 2/2008 | Nakayama et al. ........... | 428/220 |

(Continued)

FOREIGN PATENT DOCUMENTS

| | | |
|---|---|---|
| JP | 2005-293937 | 10/2005 |
| JP | 2006-024500 A | 1/2006 |

(Continued)

*Primary Examiner* — Thien S Tran
*Assistant Examiner* — Kuangyue Chen
(74) *Attorney, Agent, or Firm* — McKenna Long & Aldridge LLP

(57) ABSTRACT

The present invention provides a heating glass including a glass; a transparent conductive oxide (TCO) layer formed on one surface of the glass; and a thermal conductive pattern formed on the transparent conductive oxide layer, and a method of manufacturing the same.

8 Claims, 5 Drawing Sheets

(56) References Cited

U.S. PATENT DOCUMENTS

| | | |
|---|---|---|
| 2008/0210551 A1* | 9/2008 | Abe .................. 204/192.29 |
| 2009/0084488 A1* | 4/2009 | Kim et al. .............. 156/103 |
| 2009/0140938 A1 | 6/2009 | Ishibashi et al. |
| 2011/0017719 A1 | 1/2011 | Choi et al. |
| 2011/0017726 A1 | 1/2011 | Choi et al. |
| 2011/0062146 A1 | 3/2011 | Kuriki |
| 2011/0115972 A1* | 5/2011 | Voges .................. 348/373 |
| 2011/0256325 A1* | 10/2011 | Sanderson et al. ........... 428/34 |

FOREIGN PATENT DOCUMENTS

| | | |
|---|---|---|
| JP | 2006-024501 A | 1/2006 |
| JP | 2009-199746 A | 9/2009 |
| KR | 10-1998-0008827 A | 4/1998 |
| KR | 10-2008-0004556 A | 1/2008 |
| KR | 10-2009-0113757 A | 2/2009 |
| KR | 10-2009-0099502 | 9/2009 |
| WO | WO 2009-139458 A1 | 11/2009 |

* cited by examiner

HEATING GLASS AND MANUFACTURING METHOD THEREOF

This application is continuation application of U.S. patent application No. 13/521,421, filed on Jul. 10, 2012, which is a national stage application of PCT/KR2011/000069, filed Jan. 6, 2011, which claims priority from Korean Patent Application No. 10-2010-0002494, filed on Jan. 12, 2010 in the KIPO, the disclosures of which are incorporated herein by reference in their entireties.

TECHNICAL FIELD

The present invention relates to a heating glass and a method of manufacturing the same, and more particularly, to a heating glass having excellent heating performance at a low voltage and exhibiting uniform heating performance to an entire area of glass so that a thermal conductive pattern is not well visible and frost and dew condensation are easily removed, and a method of manufacturing the same.

BACKGROUND ART

During the winter or on a rainy day, frost is formed on a glass surface of a vehicle because of a difference between temperatures of the outside and inside of the vehicle. In addition, in the case of an indoor ski resort, a freezing phenomenon occurs because of a difference between temperatures of the inside where there is a slope and the outside of the slope. Heating glass has been developed in order to solve the problem. The glass is a concept that after a thermal conductive pattern sheet is attached to a surface of glass or a thermal conductive pattern is directly formed on the surface of glass, heat is generated from the thermal conductive pattern by applying electricity to both terminals of the thermal conductive pattern, thus increasing a temperature of the surface of glass. It is important for the heating glass for vehicles or buildings to have low resistance in order to smoothly generate heat, and, more importantly, the heating glass should not be unpleasant to the human eyes. Accordingly, a known heating glass is manufactured through ITO (indium tin oxide) sputtering. In another method, a fine pattern that cannot be recognized by a person is manufactured on a surface of glass by a photolithography manner. However, since a manufacturing process is complicated and a material is seriously wasted in the aforementioned method, the glass cannot be manufactured at low cost, thus hindering generalization of the heating glass.

Further, in the case of glass on which TCO (transparent conductive oxide) such as ITO (indium tin oxide) is deposited, there is a problem in that heating performance suitable to remove frost and dew condensation at a low voltage is not implemented.

DISCLOSURE

Technical Problem

The present invention has been made in an effort to provide a heating glass having excellent heating performance at a low voltage and exhibiting uniform heating performance to an entire area of glass so that a thermal conductive pattern is not well visible, an infrared ray (IR) blocking function is ensured, and frost and dew condensation are easily removed, and a method of manufacturing the same.

Technical Solution

An exemplary embodiment of the present invention provides a heating glass including: a glass; a transparent conductive oxide (TCO) layer formed on one surface of the glass; and a thermal conductive pattern formed on the transparent conductive oxide layer.

Another exemplary embodiment of the present invention provides a heating glass laminate including: a glass; a transparent conductive oxide (TCO) layer formed on one surface of the glass; a thermal conductive pattern formed on the transparent conductive oxide layer; an attachment film provided on a surface of the glass, on which the thermal conductive pattern is formed; and a glass provided on the attachment film.

Yet another exemplary embodiment of the present invention provides a method of manufacturing a heating glass, including: a) printing a paste including a thermal conductive material on one surface of a glass, on which a transparent conductive oxide layer is formed, by a printing method, and b) forming a thermal conductive pattern by firing the printed paste including the thermal conductive material.

Still another exemplary embodiment of the present invention provides a method of manufacturing a heating glass laminate, including: a) printing a paste including a thermal conductive material on one surface of a glass, on which a transparent conductive oxide layer is formed, by a printing method, b) forming a thermal conductive pattern by firing the printed paste including the thermal conductive material, and c) performing bonding by sequentially laminating an attachment film and the glass on a surface of glass, on which the thermal conductive pattern is formed.

Advantageous Effects

According to the exemplary embodiments of the present invention, there are provided a heating glass having excellent heating performance at a low voltage and exhibiting uniform heating performance to an entire area of glass so that a thermal conductive pattern is not well visible, an infrared ray (IR) blocking function is ensured, and frost and dew condensation are easily removed, and a method of manufacturing the same.

Best Mode

Figure 5:
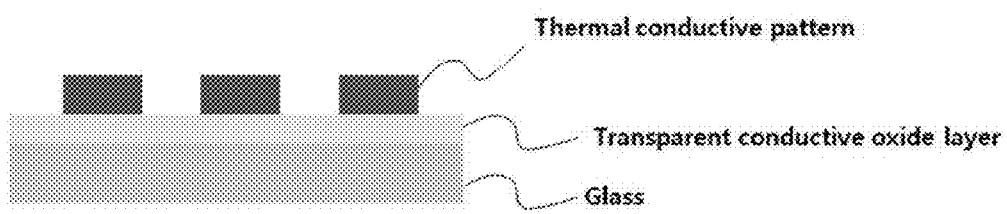
FIG. 5 illustrates a heating glass including includes a glass, a transparent Conductive oxide layer, and a thermal conductive pattern.

A heating glass according to the present invention includes a glass; a transparent conductive oxide layer formed on one surface of the glass; and a thermal conductive pattern formed on the transparent conductive oxide layer. See, FIG. 5.

The heating glass according to the present invention is characterized in that the thermal conductive pattern is formed on the transparent conductive oxide layer formed on one surface of the glass. In the case of the glass including only the transparent conductive oxide layer on the surface thereof, heating performance suitable to remove frost and dew condensation at a low voltage is not exhibited. However, in the present invention, since the thermal conductive pattern is provided on the transparent conductive oxide (TCO) layer formed on one surface of the glass, it is possible to provide the heating glass where the pattern is not visible and heating performance is excellent even at a low voltage. Particularly, in the present invention, transmittance of IR rays may be reduced while transmittance of visible rays is maximized by using the transparent conductive oxide layer and the thermal conductive pattern having a predetermined line width simultaneously.

Fluorine tin oxide (FTO), indium tin oxide (ITO) or AZO or GZO including zinc oxide (ZnO), and aluminum (Al) or gallium (Ga) used as a dopant may be used as the transparent conductive oxide, but the transparent conductive oxide is not limited thereto.

It is preferable that the thickness of the transparent conductive oxide layer be 0.01 to 10 μm.

In the case where the thickness of the transparent conductive oxide layer is less than 0.01 μm, sufficient conductivity is not ensured, and in the case where the thickness is more than 10 μm, transmittance may be reduced.

The transparent conductive oxide has a band gap of 3.5 eV or more. Further, if free electron density has a value of a predetermined level or more, the wavelength of a visible ray region may pass therethrough and the wavelength of a long wavelength region may reflect thereon. Thereby, an excellent field of vision is ensured by passing of visible rays, and transmittance of IR rays may be reduced.

The thermal conductive pattern may be formed by a printing method.

The thermal conductive pattern formed by the printing method may slightly vary according to the kind of the paste or the printing method, but the surface thereof may be rounded by surface tension of the paste including the thermal conductive material. This surface shape cannot be formed by a known photolithography method.

The vertical cross section of the rounded thermal conductive pattern may have a lenticular lens shape. The angle between the tangential line at a contact point of the thermal conductive pattern and the surface of the transparent conductive oxide layer, and the surface of the transparent conductive oxide layer is 80° or less, preferably 75° or less and more preferably 60° or less. It is preferable that the straight line area in the rounded upper surface of the vertical cross section of the thermal conductive pattern be 1/50 or less in a circumference direction.

The line width of the thermal conductive pattern may be 100 μm or less and preferably 0.1 to 30 μm. The interval between the lines of the thermal conductive pattern may be 200 μm to 30 mm.

In the present invention, it is possible to improve heating performance and maximize transmittance of visible rays by forming the thermal conductive pattern having the line width of 100 μm or less and preferably 30 μm or less on the aforementioned transparent conductive oxide layer. Particularly, since the thermal conductive pattern having the aforementioned line width hardly blocks visible rays passing through the transparent conductive oxide layer, the field of vision may not be disturbed.

The heating glass according to the present invention may have physical properties of transmittance of visible rays of 90% or more and transmittance of IR rays of 50% or less at a wavelength of 2 micrometers or more by the aforementioned constitution. Further, the heating glass according to the present invention may have an excellent heating property while having the aforementioned transmittances of visible rays and IR rays. For example, when the line width of the thermal conductive pattern is 20 micrometers and the line height thereof is 1.5 micrometers, a heating value may be 200 to 400 W/m$^2$ at 10 V in the size of the front window of the actual vehicle. As described above since the heating glass according to the present invention exhibits the excellent heating property, the heating glass may be implemented at a low voltage.

Generally, the opening ratio of the pattern is reduced as the line width is increased and the interval between the lines is reduced, and transmittance of visible rays is reduced as the opening ratio is reduced. Meanwhile, since resistance is reduced under the condition of reduction of transmittance of visible rays, the heating value is increased as transmittance of visible rays is reduced. However, in the present invention, transmittance of visible rays is increased by controlling the line width and the interval between the lines as described above, and low transmittance of IR rays and the excellent heating property may be exhibited by using the transparent conductive oxide layer and the thermal conductive pattern together.

The height of the line of the thermal conductive pattern from the surface of the transparent conductive oxide layer may be 1 to 100 μm. Preferably, the height is about 10 μm.

In the case where the numerical values of the thermal conductive pattern are less than the aforementioned range, sufficient heating performance cannot be obtained.

The thermal conductive pattern may have a stripe, diamond, square lattice, or circle form, but is not limited thereto.

For example, when the fluorine tin oxide layer is deposited in a thickness of about 1 μm or less on the glass having the size of 1 m$^2$, the heating performance of the heating glass is about 700 W/m$^2$ at 110 V. However, in the present invention, the heating value of about 400 W/m$^2$ may be implemented at a low voltage of about 10 V by forming the thermal conductive pattern on the fluorine tin oxide layer deposited on one surface of the glass.

Examples of the thermal conductive material for forming the thermal conductive pattern may include copper or silver.

The heating glass according to the present invention may be connected to the power for heating, and in this case, the heating value is 100 to 500 W and preferably 200 to 300 W per m$^2$. Since the heating glass according to the present invention has the excellent heating performance even at the low voltage, for example, 30 V or less and preferably 20 V or less, the heating glass may be usefully used in vehicles and the like. The resistance of the heating glass is 5 ohm/square or less, preferably 1 ohm/square or less, and more preferably 0.3 ohm/square or less.

The heating glass according to the present invention may have a shape of curved surface.

Figure 6:
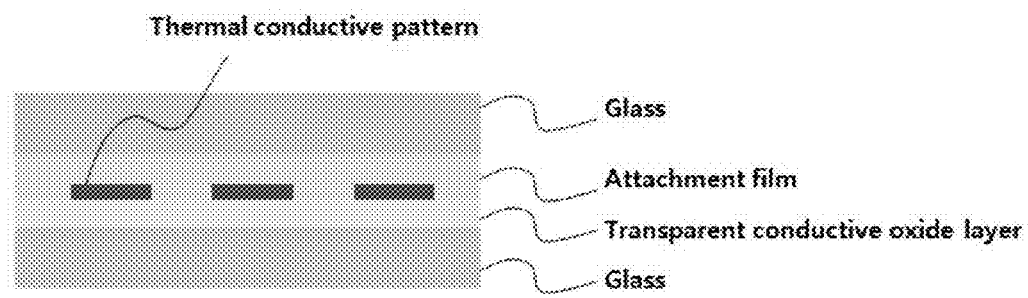
FIG. 6 illustrates a heating glass including includes a glass, a transparent conductive oxide layer, a thermal conductive pattern, an attachment film, and a glass.

A heating glass laminate according to the present invention may include a glass; a transparent conductive oxide layer formed on one surface of the glass; a thermal conductive pattern formed on the transparent conductive oxide layer; an attachment film provided on a surface of the glass, on which the thermal conductive pattern is formed; and a glass provided on the attachment film. See, FIG. 6. Since all contents described in the heating glass are applied thereto, a detailed description thereof will be omitted. The heating glass laminate according to the present invention may have a shape of curved surface.

Figure 2:
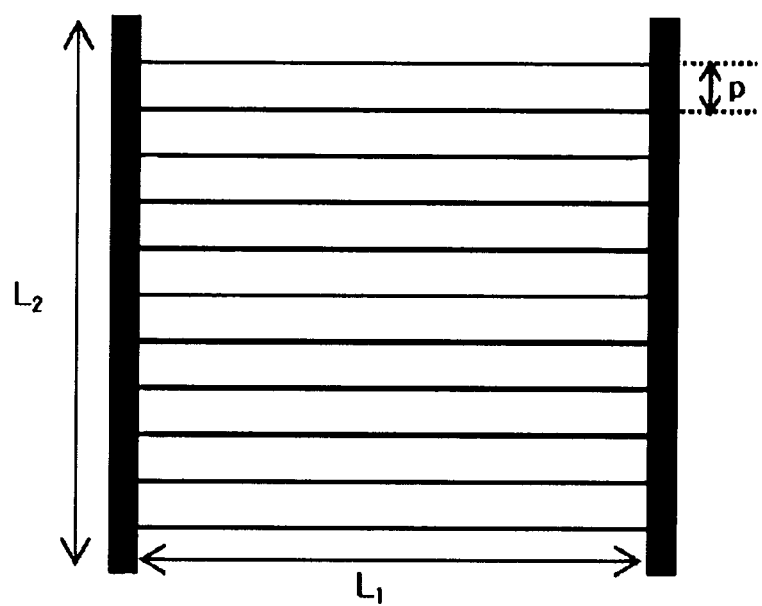
FIG. 2 illustrates an example of heating glass for vehicles.

FIG. 2 illustrates the detailed embodiment of the heating glass for vehicles. If the thermal conductive pattern having the line width of 20 μm and the height of 1.5 μm is formed as shown in FIG. 2 assuming that the heating value required in the vehicle is 200 to 300 W, when three thermal conductive patterns per 1 mm, that is, the thermal conductive patterns having the pitch of about 330 μm, are formed, desired performance is implemented. In this case, the opening ratio is 310/330=93.9%, which is suitable to be used for vehicles. In addition, in the case where specific resistance of the thermal conductive pattern material is two times higher, if the pitch is set to 165 μm, the opening ratio is 87.8% while the same heating value is obtained, which corresponds to transmittance suitable to be used for vehicles.

The heating glass having the stripe shape according to FIG. 2 has the following physical properties.

$$R(\Omega) = \rho \times (L_1/nA) = \rho \times (L_1 \times p)/(L_2 \times w \times h)$$

$$Ar(\%) = (1 - w/p) \times 100$$

R: Resistance between bus bars
Ar: Opening ratio
ρ: Specific resistance of the thermal conductive pattern (Ω·cm)
$L_1$: Interval between bus bars (cm)
n: Number of thermal conductive patterns
A: Cross-sectional area of the conductive line (cm$^2$)
p: Interval between lines of thermal conductive patterns (cm)
$L_2$: Length of the bus bar (cm)
w: Width of the thermal conductive pattern (cm)
h: Height of the thermal conductive pattern (cm)

That is, in the case where the line width w of the thermal conductive pattern is 20 μm, the height h is 1.5 μm, specific resistance p is 3×10$^{-6}$ Ω·cm, the interval p between the lines of the thermal conductive pattern is 300 μm, $L_1$ is 1 m, and $L_2$ is 1 m, R is 0.3Ω and the opening ratio is 93.3%, and in this case, if 12 V is applied to both terminals thereof, heating of 480 W is obtained.

A method of manufacturing a heating glass according to the present invention may include a) printing a paste including a thermal conductive material on one surface of a glass, on which a transparent conductive oxide layer is formed, by a printing method, and b) forming a thermal conductive pattern by firing the printed paste including the thermal conductive material.

In the case of the glass used in step a), the glass including the transparent conductive oxide layer manufactured in advance may be used in step a), or the glass may be used in step a) after performing in advance the step of preparing the glass on which the transparent conductive oxide layer is formed by forming the transparent conductive oxide on one surface of the glass prior to step a). Examples of a method of forming the transparent conductive oxide layer on one surface of the glass may include a sputtering method and an atmospheric pressure chemical vapor deposition (AP CVD) method.

In step a), the paste including the thermal conductive material is printed on one surface of the glass, on which the transparent conductive oxide layer is formed, by the printing method. A method of forming a thermal conductive pattern of a heating glass by a photolithography manner is known in the related art, but a manufacturing process is complicated and a high cost is required in this manner. However, in the present invention, a relatively low cost may be required, a manufacturing process may be simple, and a precise thermal conductive pattern having the small line width may be formed by forming the paste for forming the thermal conductive pattern by the printing method.

The printing method is not particularly limited, and a printing method such as offset printing, screen printing, and gravure printing may be used. For example, the offset printing may be performed by using the method in which after the paste is filled in the intaglio on which the pattern is formed, first transferring is performed by using silicon rubber that is called the blanket, and second transferring is performed by bringing the blanket and glass close contact with each other, but is not limited thereto.

Most of the paste is transferred on glass because of the release property of the blanket, and as a result, a separate blanket washing process is not required. The intaglio may be manufactured by precisely etching the soda lime glass on which the desired thermal conductive pattern is formed, and metal or DLC (diamond-like carbon) coating may be performed on the surface of glass for the durability. The intaglio may be manufactured by etching the metal plate.

Figure 1:
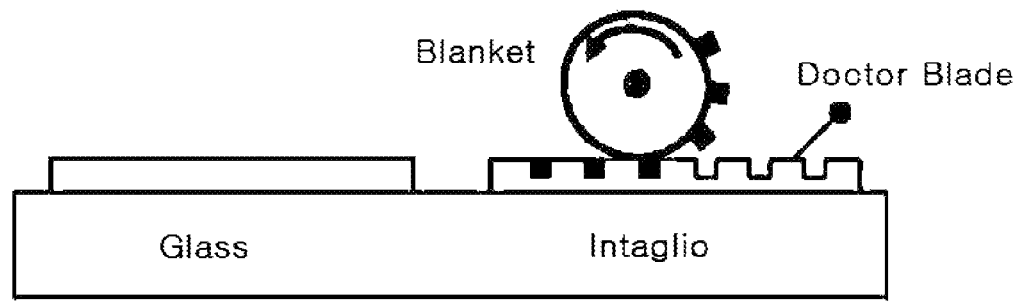
FIG. 1 is a mimetic diagram illustrating an offset printing process.
Figure 1:
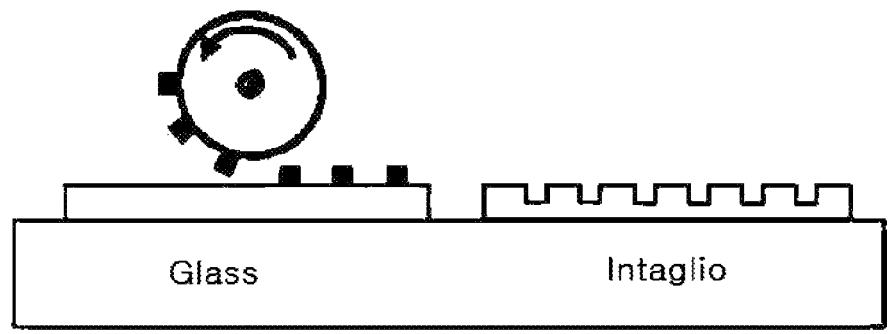

In the present invention, it is most preferable to use the offset printing method in order to implement the more precise thermal conductive pattern. FIG. 1 illustrates the offset printing method. According to FIG. 1, after the paste is filled in the pattern of the intaglio by using a doctor blade in a first step, the first transferring is performed by rotating the blanket, and the second transferring is performed on the surface of glass by rotating the blanket in a second step.

Metal having excellent thermal conductivity is preferably used as the thermal conductive material of step a), copper, silver and the like may be used, and silver is most preferable. In the present invention, the thermal conductive material may be used in a particle form.

The paste of step a) may further include an organic binder in addition to the aforementioned thermal conductive material so that the printing process is easily performed. It is preferable that the organic binder have a volatile property in the firing process. In addition, the paste may further include a glass frit in order to improve the attachment strength of the paste to glass. If necessary, a solvent may be further added.

The paste of step a) may be printed so that the line width of the printing pattern line after the firing is 100 μm or less and preferably 0.1 to 30 μm or less, may be printed so that the interval between the printing pattern lines after the firing is 200 μm to 30 mm, and may be printed so that the height of the line from the surface of the transparent conductive oxide layer is 1 to 100 μm.

The printing pattern printed in step a) may have a diamond, rectangular lattice or circle form in addition to the stripe shown in FIG. 2, and is not limited to a specific form. It is preferable that the opening ratio in the printing pattern, that is, a ratio of a region of the glass not covered by the printing pattern, be 70% or more.

For example, the thermal conductive pattern of step b) may be a grid type pattern having a line width of 20 μm and an interval between lines of 280 μm, and heating performance of the pattern may be about 500 W/m$^2$.

If the aforementioned paste is printed in a predetermined pattern on glass by using the printing method and then subjected to the firing process of step b), a pattern having thermal conductivity is formed. In this case, a firing temperature is not particularly limited, but may be 400 to 700° C. and preferably 500 to 650° C. If necessary, the glass may be shaped so as to correspond to the purpose such as buildings or vehicles in the firing step. For example, the glass may be shaped like glass having a curved surface of a vehicle in the firing step.

Further, a method of manufacturing a heating glass laminate according to the present invention may include a) printing a paste including a thermal conductive material on one surface of a glass, on which a transparent conductive oxide layer is formed, by a printing method, b) forming a thermal conductive pattern by firing the printed paste including the thermal conductive material, and c) performing bonding by sequentially laminating an attachment film and the glass on the surface of the glass, on which the thermal conductive pattern is formed. Since all contents described in the method of manufacturing the heating glass are applied thereto, a detailed description thereof will be omitted.

The attachment film is not particularly limited as long as the film is used in the art, and, for example, a PVB film or an EVA film may be used. The PVB film is not particularly limited, but it is preferable that the thickness thereof be 350 to 450 μm.

The glass bonded to the attachment film may be formed of only glass and may be formed of glass that is provided with the thermal conductive pattern manufactured as described above.

If necessary, prior to the bonding step, a step of forming an electrode connected to the thermal conductive pattern may be further included.

In step c), a method known in the art may be used as the bonding method.

Mode For Invention

Hereinafter, the present invention will be described in more detail through Examples.

EXAMPLE 1

The FTO glass (surface resistance: 15 Ω/square), on a surface of which the fluorine tin oxide layer was formed, was prepared. Further, the silver paste was prepared by dissolving 80% of silver particles having the particle diameter of 2 μm, 5% of polyester resin, and 5% of glass frit in 10% BCA (butyl carbitol acetate) solvent.

In addition, the glass having the grid type pattern formed to have the interval of 300 μm, the width of 20 μm, and the depth of 10 μm and have the right angle was prepared as the flat plate for printing.

Next, the grid type silver thermal conductive pattern was formed on the surface of the FTO glass FTO layer by using the offset printer, and then fired at 650° C. for 3 min to form the silver thermal conductive pattern. In this case, the interval between the lines of the formed silver thermal conductive pattern was 300 μm, the line width was 25 μm, the height of the line was 1.5 μm, and the opening ratio was 84%.

COMPARATIVE EXAMPLE 1

The FTO glass heating glass (surface resistance: 15 Ω/square), on a surface of which the fluorine tin oxide layer was formed, was prepared.

COMPARATIVE EXAMPLE 2

After the grid type silver thermal conductive pattern was formed on the surface of the glass by using the silver paste manufactured in Example 1 by the offset printer, firing was performed at 650° C. for 3 min to form the silver thermal conductive pattern. In this case, the interval between the lines of the formed silver thermal conductive pattern was 300 μm, the line width was 25 μm, the height of the line was 1.5 μm, and the opening ratio was 84%.

EXPERIMENTAL EXAMPLE

Driving Voltage

The bus bar was formed by bringing the copper strip into contact with the heating glass manufactured in Example 1 and Comparative Example 1 by using the clip. Thereafter, the voltage when the heating glass had the heating value of 400 W/cm$^2$ was measured, and is described in the following Table 1.

TABLE 1

|  | Voltage when a heating value is 400 W/cm$^2$ |
| --- | --- |
| Example 1 | 10 V |
| Comparative Example 1 | 75 V |

As shown in the aforementioned result, it can be seen that the heating glass according to the present invention exhibits the high heating value even at a low voltage.

IR Blocking Test

Figure 3:
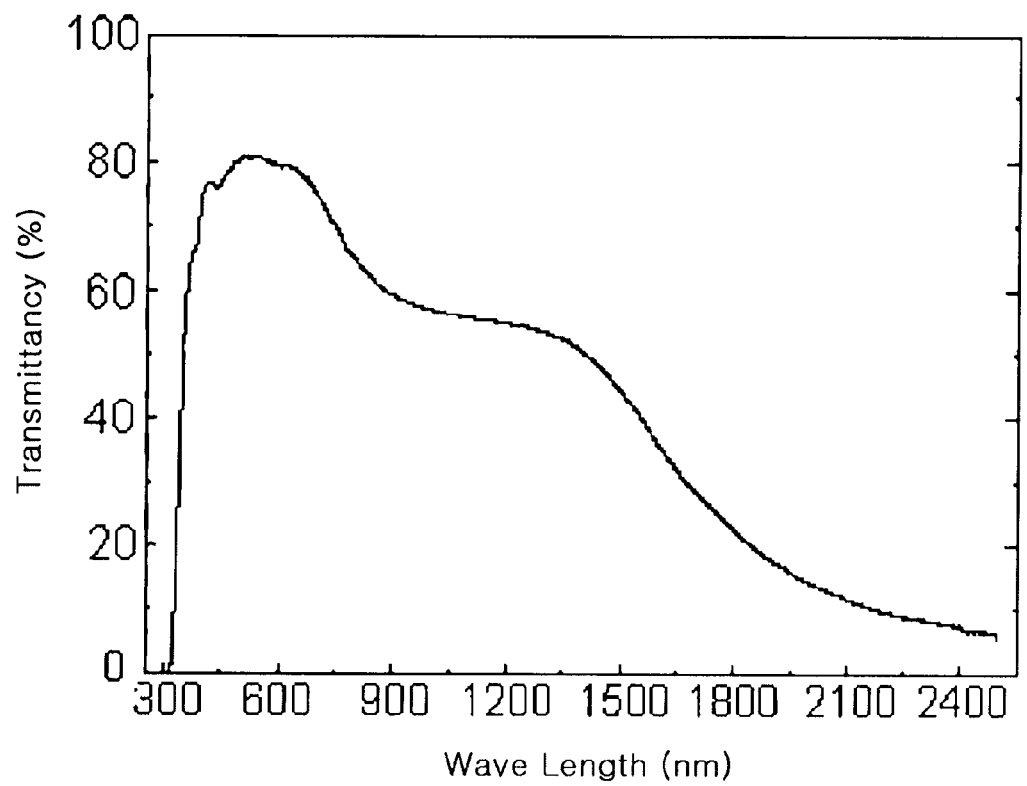
FIG. 3 is a graph illustrating transmittance according to a wavelength range of heating glass manufactured according to Example 1 of the present invention.
Figure 4:
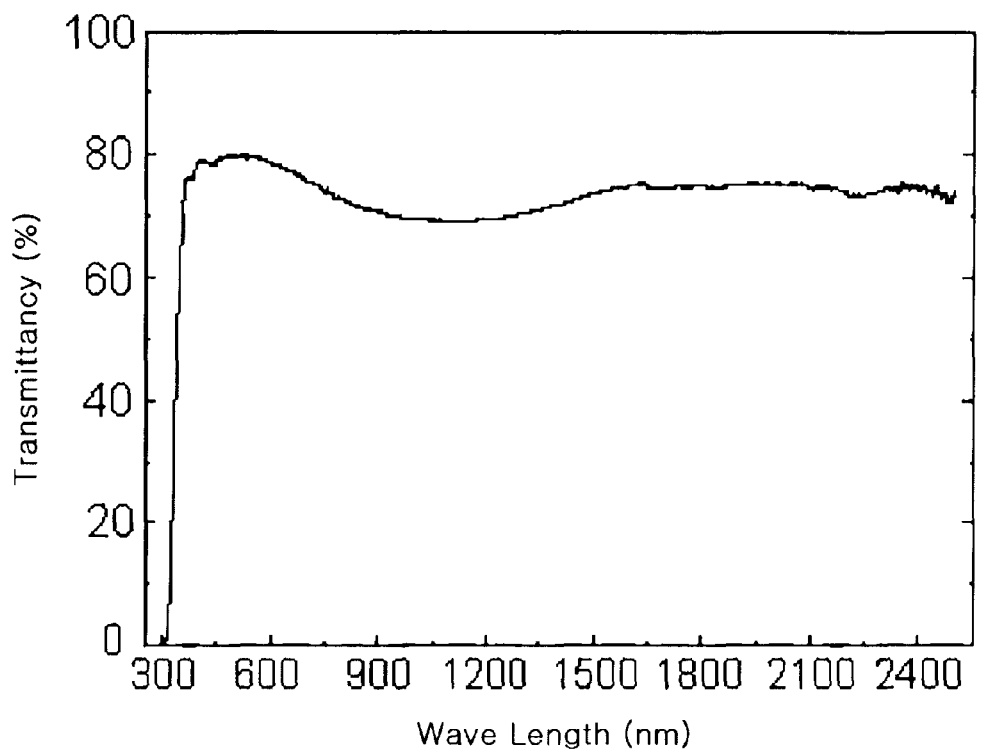
FIG. 4 is a graph illustrating transmittance according to a wavelength range of heating glass manufactured according to Comparative Example 2.

Transmittances of the heating glass manufactured in Example 1 and Comparative Example 2 were measured by using the spectrometer in a wavelength region of 300 to 2500 nm, and the results are shown in FIGS. 3 and 4.

As shown in the results, it can be seen that transmittance of the heating glass according to the present invention is reduced in the region of 900 nm or more, but transmittance of the heating glass according to Comparative Example 2 is high for the entire region.

The invention claimed is:

1. A heating glass comprising:
   a glass;
   a transparent conductive oxide (TCO) layer formed on one surface of the glass;
   a thermal conductive pattern formed on the transparent conductive oxide layer, and an attachment film provided on a surface of the transparent conductive oxide layer, on which the thermal conductive pattern is formed; and an additional glass provided on the attachment film,
   wherein the heating glass has a transmittance of a visible ray of 90% or more and transmittance of an infrared ray of 50% or less at a wavelength of 2 micrometers or more,
   wherein the transparent conductive oxide is indium tin oxide (ITO),
   wherein a line width of the thermal conductive pattern is 100 μm or less, an interval between lines is 200 μm to 300 mm, and a height is 1 to 100 μm from a surface of the transparent conductive oxide layer,
   wherein a thickness of the transparent conductive oxide layer is 0.01 to 10 μm and
   wherein the thermal conductive pattern includes copper or silver.

2. The heating glass of claim 1, wherein the thermal conductive pattern is formed by a printing method.

3. A method of manufacturing a heating glass, comprising:
   a) printing a paste including a thermal conductive material on one surface of a glass, on which a transparent conductive oxide layer is formed, by a printing method,
   b) forming a thermal conductive pattern by firing the printed paste including the thermal conductive material, and
   c) performing bonding by sequentially laminating an attachment film and an additional glass on the surface of the transparent conductive oxide layer, on which the thermal conductive pattern is formed, wherein a line width of the thermal conductive pattern is 100 μm or less, an interval between lines is 200 μm to 300 mm, and a height is 1 to 100 μm from a surface of the transparent conductive oxide layer, and transmittance of a visible ray of the heating glass is 90% or more and transmittance of an infrared ray is 50% or less at a wavelength of 2 micrometers or more, wherein the transparent conductive oxide is indium tin oxide (ITO), wherein a thickness of the transparent conductive oxide layer is 0.01 to 10 μm, and wherein the thermal conductive pattern includes copper or silver.

4. The method of manufacturing a heating glass of claim 3, comprising:

before step a), preparing the glass, on one surface of which the transparent conductive oxide layer is formed, by forming the transparent conductive oxide layer on one surface of the glass.

5. The method of manufacturing a heating glass of claim 3, wherein the printing method is offset printing, screen printing or gravure printing.

6. The method of manufacturing a heating glass of claim 3, wherein the paste further includes an organic binder and a glass fit.

7. The method of manufacturing a heating glass of claim 3, wherein the printing is performed so that the paste is printed in a stripe, diamond, rectangular lattice or circle form.

8. The method of manufacturing a heating glass of claim 3, further comprising:

before the bonding, forming an electrode connected to the thermal conductive pattern.

* * * * *